Dec. 16, 1947. H. N. OTT 2,432,583
MOUNTING FOR SUBSTAGE PARTS OF MICROSCOPES
Original Filed Aug. 25, 1943
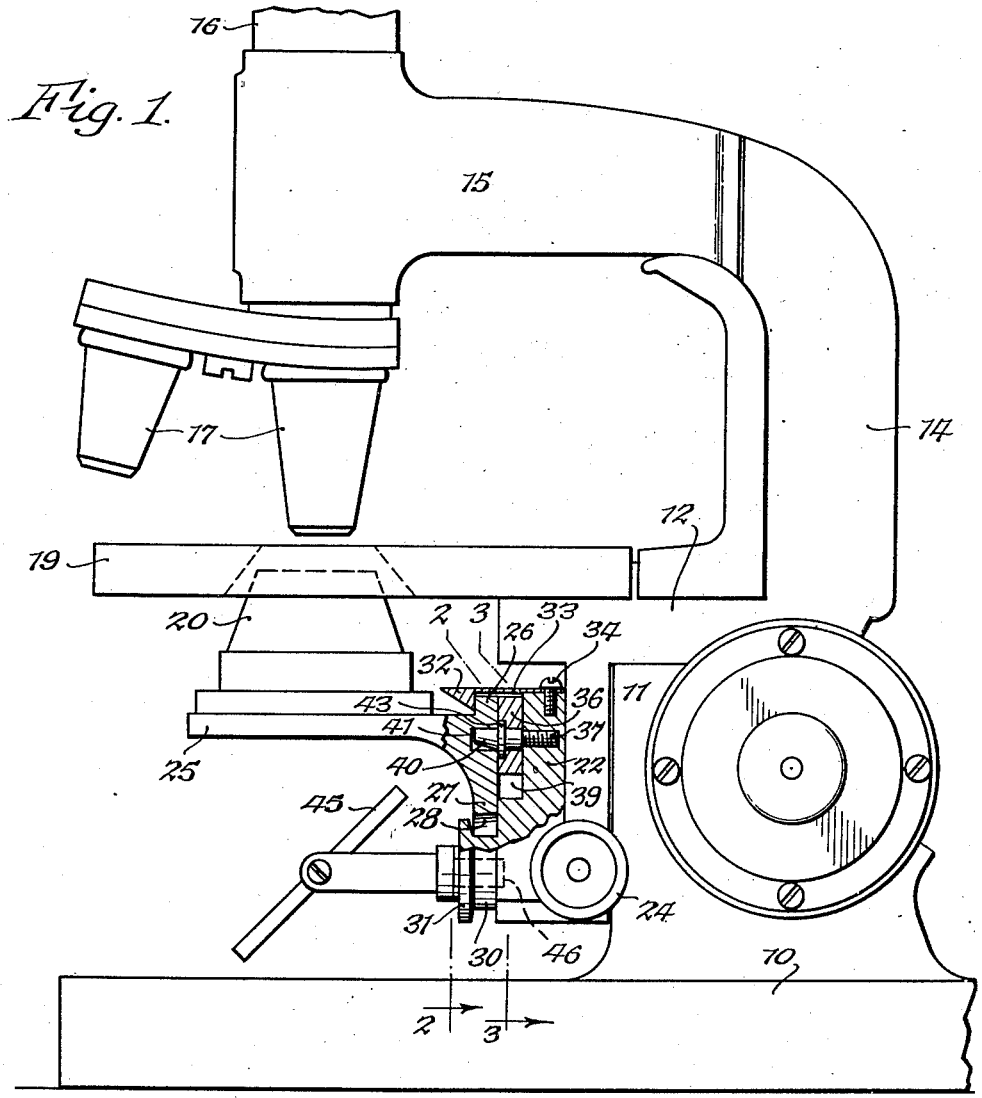
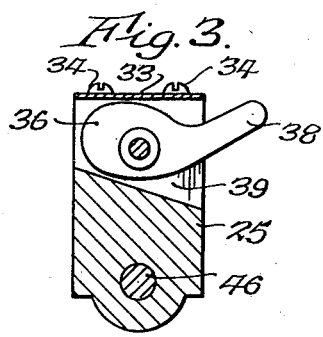
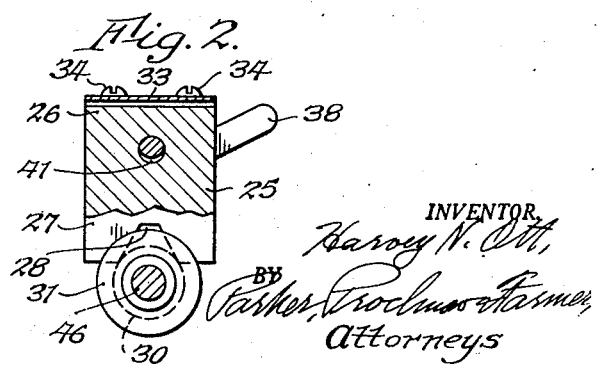

Patented Dec. 16, 1947

2,432,583

UNITED STATES PATENT OFFICE 2,432,583

MOUNTING FOR SUBSTAGE PARTS OF MICROSCOPES

Harvey N. Ott, Buffalo, N. Y.

Original application August 25, 1943, Serial No. 499,929. Divided and this application October 28, 1944, Serial No. 560,749

2 Claims. (Cl. 88—39)

This invention relates to improvements in microscopes and more particularly to the substage parts of microscopes. This application is a division of my co-pending application Serial No. 499,929 filed August 25, 1943, which has matured into Patent No. 2,421,126.

One of the objects of this invention is to provide an improved mounting of the substage parts of a microscope. A further object is to provide a mounting of this type by means of which the substage parts can be readily and accurately positioned on or removed from the microscope. Other objects and advantages of this invention will appear from the following description and claims.

In the accompanying drawings:

Fig. 1 is a fragmentary side elevation, partly in section, of a microscope provided with a mounting for substage parts embodying this invention.

Figs. 2 and 3 are sectional elevations respectively on lines 2—2 and 3—3, Fig. 1.

The substage parts and their mounting may be used in connection with any desired type of microscope. By way of example, I have shown a microscope having a base 10, which may be of any usual or suitable form and which has an upwardly extending pillar 11 on which the main frame 12 of the microscope is mounted by means of an inclination joint to permit the frame of the microscope to be tilted to various degrees for the convenience of the user. The main frame includes an upwardly extending part or projection 14 on which the arm 15 of the microscope is slidable. This arm supports the body tube 16 and one or more objectives 17 which may be of any suitable or desired construction and which are consequently not shown in detail in the drawings. The microscope also includes a stage 19 which is securely mounted on the main frame 12, and 20 represents a condenser for projecting light to the object supported on the stage. Since the structure of the body tube, objectives, stage and condenser is not a part of this invention, they are not shown in detail.

In Figs. 1 to 3, I have shown by way of example, one embodiment of my improved substage mounting. In these figures, the slide member 22 is mounted to slide in a suitable bearing in the frame 12, the slide being adjustable on the bearing by any suitable or usual means including one or more substage buttons 24. The slide 22 is provided with means for quickly attaching and detaching the condenser 20 or other substage parts therefrom, and for this purpose, I provide the substage part with a suitable supporting bracket member 25 including a substantially horizontal support for the substage part. This support or bracket is detachably mounted on the slide 22. This bracket member has an upwardly extending flange or lip 26 and a downwardly extending flange 27 both of which may be detachably connected with the slide 22. The downwardly extending part 27 may, for example, be provided with a notch or recess 28 in the middle portion of the lower edge thereof which may straddle and rest upon an outwardly extending saddle portion or cylindrical part 30 of the slide member 22. This saddle part 30 terminates in a flange 31 at the outer end thereof which serves to confine the notched lower end of the bracket 25 in place. The saddle and flange, consequently, serve not only to center the supporting bracket with reference to the slide, but also to secure the downwardly extending portion 27 in correct relation with reference to the slide.

The upward extension or flange 26 may be detachably held in place in any suitable manner, for example, by means of a spring actuated latch 32, a leaf spring portion 33 of which may be secured to the upper surface of the slide in any suitable manner, for example, by means of screws 34. The latch or detent thus holds the bracket 25 on the slide and if the latch is raised, the supporting bracket 25 may swing downwardly and the portion 27 thereof may then be raised to clear the flange 31 without lowering the slide.

Means may be provided for facilitating the unlatching of the supporting bracket 25 from the slide, and in the construction shown for this purpose, I have provided a cam lever 36 pivoted on a screw 37 secured to the slide 22, the cam lever being preferably arranged in a recess 39 formed in the face of the slide 22. The cam surface of the lever is such that if the arm 38 of the lever is swung downwardly from the positions shown in Figs. 2 and 3, the cam will engage the spring 33 of the latch 32 and lift the same upwardly so that the latch will be out of engagement with the flange or upward extension 26 of the supporting bracket 25.

Suitable means are also preferably provided for cooperation with the notch 28 and its saddle 30 to center the bracket 25 so that the same will be properly located with relation to the slide and the stage, and in the particular construction illustrated by way of example, I have provided the screw 37 with an extension 40 which is shaped to fit into a hole 41 formed in the upright portion of the supporting bracket 25. Consequently, when the bracket is to be mounted on the slide 22, the lower part 27 is first placed into engagement with the saddle 30 of the slide in such a manner that the recess 28 therein straddles the saddle. At the same time the extension 40 of the screw is fitted into the hole 41 of the bracket 25 and the bracket is then swung so that the upper extension 26 is engaged by the latch 32 as shown in Fig. 1. The lower surface of the extension 40 of the screw is preferably beveled or relieved so as to permit the bracket to swing into its operative position. Any other suitable means may be provided for correctly locating the bracket with relation to the slide.

The screw 37 preferably has an annular collar 43 which is seated in a similarly shaped recess in the cam lever 36, so that the lever remains in its operative position in the recess in the slide 39 when the bracket is removed. 45 represents a mirror which is mounted on a bracket having a stud portion 46 which engages in a corresponding hole formed in the projection of the slide which also forms the saddle 30 and flange 31. Any other suitable means for mounting the mirror on the slide may be used.

While the supporting bracket is herein described, as detachably mounted on the slide, it will be obvious that the bracket may be mounted on any other part of the microscope.

I claim as my invention:

1. A microscope having a main frame, a stage mounted on the main frame, a slide adjustably mounted on said frame below said stage and adjustable toward and from said stage, a saddle portion projecting outwardly from said slide, a supporting member for substage parts having a bifurcated lower portion adapted to straddle said saddle, latch means for securing the upper portion of said supporting member to said slide, and a mirror supporting bracket secured to said saddle portion.

2. A microscope having a main frame, a stage mounted on the main frame, a supporting member for substage parts and having an upright attaching portion, means on the lower portion of said microscope on which the lower end of said attaching portion may rest, latch means on said microscope for engaging the upper end of said attaching portion for securing said supporting member to said microscope, a pin on said microscope cooperating with said supporting member for correctly locating said supporting member, and a cam lever pivoted on said pin for engagement with said latch means for releasing said supporting member from the microscope.

HARVEY N. OTT.

REFERENCES CITED

The following references are of record in the file of this patent:

UNITED STATES PATENTS

| Number | Name | Date |
|---|---|---|
| 1,549,793 | Ott et al. | Aug. 18, 1925 |
| 2,014,161 | Bauersfeld | Sept. 10, 1935 |